(12) United States Patent
Linsky et al.

(10) Patent No.: US 6,944,140 B1
(45) Date of Patent: Sep. 13, 2005

(54) BEAM HOPPING SELF ADDRESSED PACKET SWITCHED COMMUNICATION SYSTEM WITH MULTIPLE BEAM ARRAY ANTENNA

(75) Inventors: Stuart T. Linsky, San Pedro, CA (US); Harvey L. Berger, Redondo Beach, CA (US); Dennis A. Nivens, Hermosa Beach, CA (US); Garrick J. Harmon, Redondo Beach, CA (US); Fred C. Tramm, Rancho Palos Verdes, CA (US); Robert W. White, Playa del Rey, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 771 days.

(21) Appl. No.: 09/599,150

(22) Filed: Jun. 21, 2000

(51) Int. Cl.$^7$ ............................................ H04B 7/185
(52) U.S. Cl. ................................................. 370/323
(58) Field of Search ............................. 370/316, 323, 370/325, 334, 389, 395.1, 395.7

(56) References Cited

U.S. PATENT DOCUMENTS

| | | | |
|---|---|---|---|
| 3,864,679 A * | 2/1975 | Hannan et al. ............. 342/405 |
| 5,432,777 A * | 7/1995 | Le Boudec et al. ......... 370/397 |
| 5,596,722 A | 1/1997 | Rahnema |
| 5,617,108 A * | 4/1997 | Silinsky et al. ............. 343/786 |
| 5,870,396 A | 2/1999 | Abu-Amara et al. |
| 5,875,181 A * | 2/1999 | Hsu et al. ................... 370/320 |
| 5,905,957 A * | 5/1999 | Olds ........................ 455/435.1 |
| 6,377,558 B1 * | 4/2002 | Dent .......................... 370/321 |
| 6,593,893 B2 * | 7/2003 | Hou et al. .................. 343/786 |
| 6,738,346 B1 * | 5/2004 | Prieto et al. ............... 370/229 |
| 2001/0005671 A1 * | 6/2001 | Peyrovian .................. 455/12.1 |
| 2003/0207684 A1 * | 11/2003 | Wesel ......................... 455/427 |

FOREIGN PATENT DOCUMENTS

| | | |
|---|---|---|
| EP | 0889605 | 1/1999 |
| EP | 0 987 837 A2 | 3/2000 |
| EP | 0987837 | 3/2000 |

OTHER PUBLICATIONS

Gerakoulis et al. "A Satellite-Switched CDMA System for Fixed Service Communications". IEEE. Jul. 1999. pp. 86-92.*
Gilderson et al. "Onboard Switching for ATM via Satellite". IEEE. Jul. 1997. pp. 66-70.*
David J. Goldstein, et al., "GRS: A Dynamic GBS Downlink Beam Scheduling Tool," Aerospace Conference, 199 Proceedings, p. 5, (Mar. 6, 1999).

* cited by examiner

*Primary Examiner*—Chi Pham
*Assistant Examiner*—Derrick W Ferris
(74) *Attorney, Agent, or Firm*—Noel F. Heal

(57) ABSTRACT

A data routing subsystem (200) for a communication satellite includes an inbound module (602) that accepts demodulated uplink data. The inbound module (602) includes a routing table (702) that stores queue tags (714) specifying downlink beam hop locations (302, 304) for the uplink data. The subsystem (200) also includes a self addressed packet switch (608) having an input port coupled to the inbound module (602), and an outbound module (610) coupled to an output port of the switch (608). A memory (804) in the outbound module (610) stores the uplink data in accordance with the downlink beam hop locations (302, 304). A multiple beam array antenna (116-122) is coupled to the outbound module (610). The multiple beam array antenna (116-122) includes a first feed element (116) assigned to a first downlink beam hop location (302) and a second feed element (118) assigned to a second downlink beam hop location (304).

18 Claims, 9 Drawing Sheets

BEAM HOPPING SELF ADDRESSED PACKET SWITCHED COMMUNICATION SYSTEM WITH MULTIPLE BEAM ARRAY ANTENNA

CROSS-REFERENCE TO RELATED APPLICATIONS

This application is related to application Ser. No. 09/599,148, filed Jun. 15, 2000, titled "Beam Hopping Self Addressed Packet Switched Communication System with Power Gating; application Ser. No. 09/599,041, filed Jun. 21, 2000, titled "Beam Hopping Self Addressed Packet Switched Communication System with Locally Intelligent Scheduling"; and application Ser. No. 09/599,035, filed Jun. 21, 2000, titled "Beam Hopping Self Addressed Packet Switched Communication System with Multi-port Shared Memory".

BACKGROUND OF THE INVENTION

The present invention relates to satellite communication systems. In particular, the present invention relates to a satellite communication system including a self addressed packet switch that hops a downlink beam between terrestrial cells using a multiple beam array antenna.

Satellites have long been used to provide communication capabilities on a global scale. For this purpose, a satellite includes multiple uplink and downlink antennas, each of which provides communication bandwidth to a large service region using multiple spot beams. The area covered by a spot beam is commonly referred to as a cell, and color coded spot beams are assigned in a pattern called a beam laydown to cover the service region.

Each spot beam provides limited bandwidth. Yet, as a satellite provides additional simultaneous spot beams, the cost, complexity, and power requirements of the satellite increase. Thus, the ability to provide service to a laydown with a large number of cells was limited by prior satellite and antenna design and cost considerations.

Furthermore, prior satellite designs typically operated on a circuit switched basis that directed downlink traffic to cells according to a fixed switching schedule internal to the satellite. With the increasing adoption of terrestrial communication systems that carry data containing its own destination address, has come the need to route such data through a satellite link. Circuit switched satellites, however, were generally too inflexible to route such data.

A need has long existed in the industry for a communication system that addresses the problems noted above and others previously experienced.

BRIEF SUMMARY OF THE INVENTION

A preferred embodiment of the present invention provides a beam hopping self addressed packet switched communication satellite. The satellite includes a self addressed packet switch that routes uplink data to a memory according to at least one of a first and a second downlink beam hop location for the uplink data.

As an example, the memory may be segmented into queues assigned to 16 different hop locations, 16 priorities, and 2 code rates.

The satellite also includes a switch that directs a waveform derived in part from the uplink data to a selected radiating element of a multiple beam array antenna in response to a hop selection signal. The multiple beam array antenna directs the waveform to at least one of the first downlink beam hop location and the second downlink beam hop location.

As an example, the multiple beam array antenna may include a first feed horn for the first downlink beam hop location and a second feed horn for the second downlink beam hop location.

Another preferred embodiment of the present invention provides a data routing subsystem for a communication satellite. The subsystem includes an inbound module that accepts demodulated uplink data. The inbound module includes a routing table that stores queue tags specifying downlink beam hop locations for the uplink data. The subsystem also includes a switch having an input port coupled to the inbound module, and an outbound module coupled to an output port of the switch.

The outbound module includes a memory that stores the uplink data routed through the switch in accordance with the queue tag. A multiple beam array antenna is coupled to the outbound module. The multiple beam array antenna includes a first feed element (e.g., a feed horn) assigned to a first downlink beam hop location and a second feed element assigned to a second downlink beam hop location.

As an example, the queue tag may also specify a code rate and a priority for the uplink data. The code rate, priority, and hop location may then determine a specific memory queue in which the uplink data is stored to await transmission. Where the uplink data are ATM cells, the routing table may be addressed using the VPI and/or VCI field in the ATM cells.

DETAILED DESCRIPTION OF THE INVENTION

Figure 1:
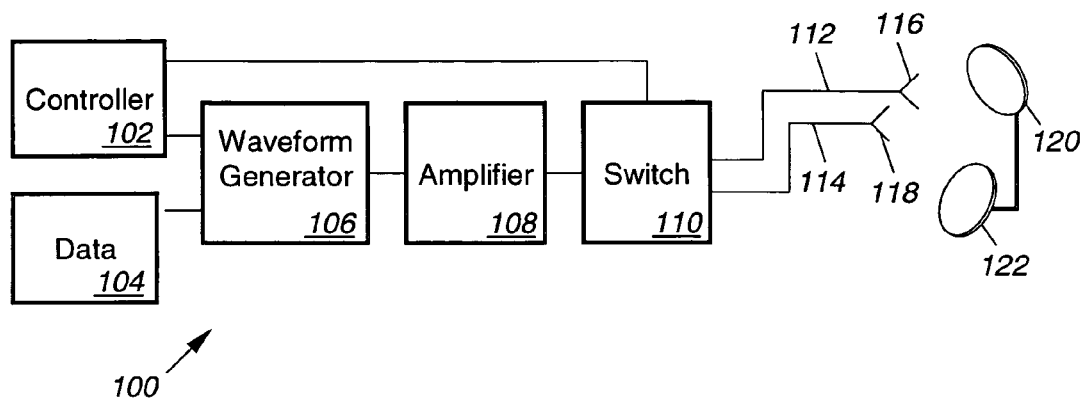
FIG. 1 illustrates a block diagram of a bandwidth switch with waveform processing chain.

Turning now to FIG. 1, that figure shows a block diagram of a bandwidth switch 100. The bandwidth switch 100 includes a controller 102 and a waveform processing chain that operates on data provided by the data source 104. In particular, the waveform processing chain includes a waveform generator 106, an amplifier 108, and a switch 110. The waveform processing chain further includes a first feed path 112 and a second feed path 114 that may be characterized by a polarization effect on the waveform that propagates along the feed paths 112–114. The polarization effect may induce, for example, clockwise (right) or counter clockwise (left) polarization in the waveform.

The first feed path 112 terminates in a first radiating element 116 (e.g., a feed horn). Similarly, the second feed path terminates in a second radiating element 118 (e.g., another feed horn). The first and second feed horns 116, 118 illuminate the subreflector 120. The subreflector 120, in turn, illuminates the main reflector 122 that projects downlink beams onto terrestrial cells. Thus, the first and second feed horns 116, 118, the subreflector 120, and the main reflector 122 form a Multiple Beam Array Antenna (MBA) to direct spot beam coverage to distinct terrestrial cells. Additional feed horns may be used with the MBA to generate additional spot beams, and multiple independent MBAs may be provided.

The waveform generator 106 accepts baseband data from the data source 104 and creates a waveform to be transmitted (after amplification by the amplifier 108). The switch 110 selects the particular feed path 112–114 along which the waveform propagates (and thus, in certain embodiments, the polarization and/or hop location associated with the waveform).

The controller 102 exercises color control over the waveform to be transmitted. Thus, the controller 102 may output one or more control signals (collectively referred to as a color selection signal) that determine, for example, the frequency, polarization, or hop location of the waveform to be transmitted. In the preferred embodiment, the beam color components include Even and odd hop locations, Left and Right polarization, and first and second frequencies. Eight different colors are therefore available: 1EL, 1ER, 1OL, 1OR, 2EL, 2ER, 2OL, 2OR.

Figure 2:
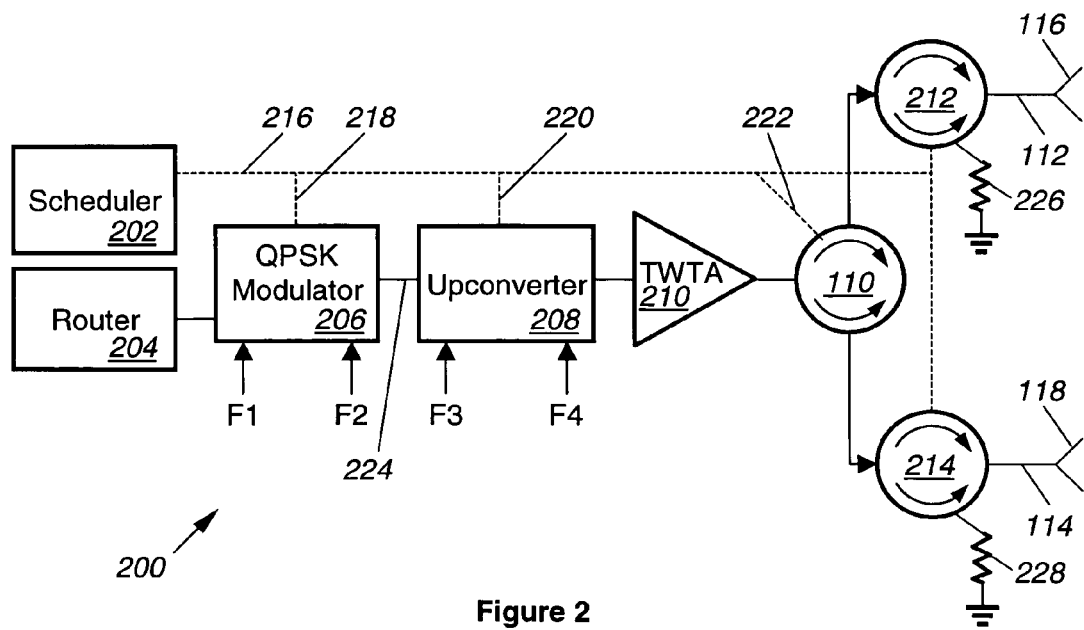
FIG. 2 shows a detailed block diagram of a bandwidth switch with waveform processing chain.

With regard to FIG. 2, a more specific implementation of a bandwidth switch 200 is shown. The bandwidth switch 200 includes a data scheduler 202, a data router 204, and a waveform processing chain including a QPSK modulator 206, an upconverter 208, and a traveling wave tube amplifier (TWTA) 210. The switch 110 is illustrated in FIG. 2 as a ferrite switch 110 that directs the waveform to be transmitted through either the first feed path 112 or the second feed path 114. Preferably, additional ferrite switches 212 and 214 in the feed paths 112–114 provide additional signal isolation (e.g., approximately 20 db between input and output when the ferrite switch is off). The additional ferrite switches 212–214 operate under control of the color selection output to pass or block a waveform to be transmitted through the feed paths 112–114. In other words, when the waveform to be transmitted is destined for the feed 112, then the ferrite switch 214 is coupled through the load 228 to ground. Similarly, when the waveform to be transmitted is destined for the feed 114, then the ferrite switch 212 is coupled through the load 226 to ground.

In addition, FIG. 2 shows a color selection output 216, two frequency selection inputs 218 and 220, a feed path selection input 222, and an intermediate waveform output 224.

During operation, the bandwidth switch 200 accepts baseband data from the router 204 (e.g., an ATM cell router), and creates a waveform to be transmitted using the waveform processing chain. The waveform processing starts by directly converting baseband I and Q data to an intermediate frequency of, for example, 750 MHz. The waveform processing then selects one of F1 (e.g., 3.175 MHz) and F2 (e.g., 3.425) and one of F3 (e.g., 16 GHz) and F4 (e.g., 17.4 GHz) to produce a waveform to be transmitted with a final center frequency at one of 18.425 GHz, 18.675 GHz, 19.825 GHz, and 20.075 GHz. The scheduler 204 monitors the propagation of data through the waveform processing chain and determines the color of the waveform to be transmitted. To that end, the scheduler 204 provides the color selection output 216 that indicates, as examples, the frequency, polarization, and hop location for the waveform to be transmitted.

The TWTA 210 amplifies the waveform to be transmitted, while the switch 110 determines along which feed path 112–114 (or additional feed paths) the amplified waveform will propagate. To that end, the switch 110 includes the feed path selection input 222 responsive to information on the color selection output 216 (e.g., a hop selection signal). Because the feed paths 112–114 are generally (though not necessarily) associated with feed horns that produce spot beams in different hop locations, the hop selection signal acts to determine the hop location of the waveform to be transmitted. The hop locations below are designated Even or odd, but are not restricted to even or odd frames. Instead Even and Odd generally designate mutually exclusive time periods.

In addition, either of the feed paths 112–114 may be characterized by a polarization effect on the waveform that propagates along the feed path. Thus, the color selection output 216 may also determine the polarization color component of the waveform to be transmitted. Optionally, however, separate feed paths may be provided for any number of desired combinations of polarization and hop location. The transmitted waveform manifests itself as a beam spot that, typically, provides downlink bandwidth for a terrestrial cell.

The bandwidth switch 200 may operate onboard a first satellite that supports a cellular coverage area using a set of spot beams. The scheduler 202 ensures that the waveforms to be transmitted have the appropriate beam colors to minimize co-channel, adjacent channel, and cross polarization for the cellular coverage area and the eight possible beam colors. However, when, for example, a second subsequently launched satellite begins to provide bandwidth support for the same cellular coverage area, the bandwidth switch 200 allows the first satellite to modify its beam colors to accommodate the second satellite. In other words, the bandwidth switch 200 allows the first and second assignment of spot beams to the coverage area to coexist in a minimally interfering manner. The resultant beam laydown may then be minimally interfering initially for a single satellite, and later reconfigured to be minimally interfering with regard to a particular type of interference or interferences for additional satellites providing bandwidth for the same coverage area.

Figure 3:
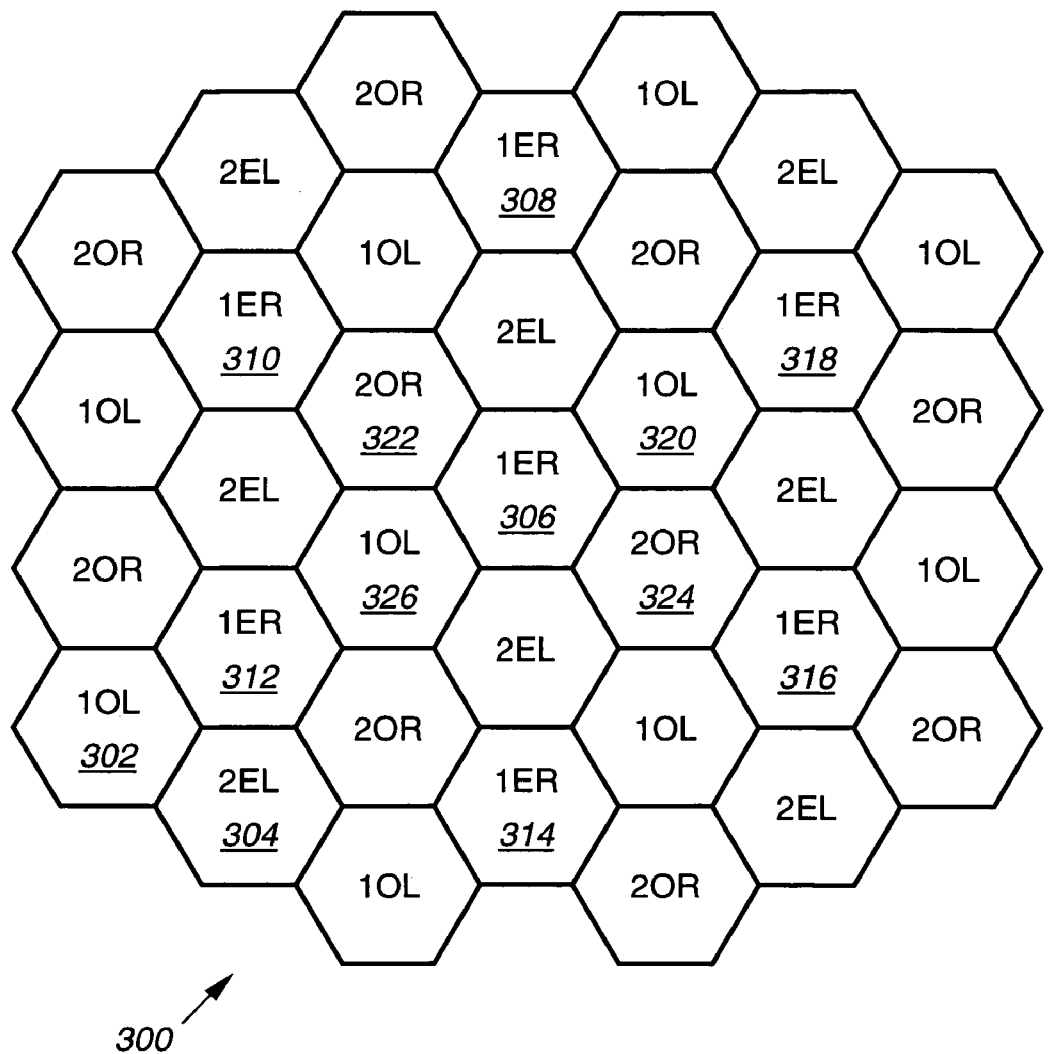
FIG. 3 illustrates a beam laydown showing both even and odd hop downlink beam color assignments.

Turning next to FIG. 3, that figure illustrates a beam laydown 300 that uses hopping beams. The coverage area is generally divided into cells as shown in idealized form, for example, by the hexagonal cells 302 and 304. Each of the cells is also labeled with a beam color. For example, a beam of color 1OL provides bandwidth for the cell 302, while a beam of color 2EL provides bandwidth for the cell 304.

The laydown 300 is characterized in that, for mutually exclusive hop locations, only six co-channel interferers (CCI) (caused by a beam of the same color), zero adjacent channel interferers (ACI) (caused by a beam differing in only one color component), and zero cross polarization interferers (XPI) (caused by a beam differing only in polarization) exist for any given cell. In other words, taking cell 306 (color 1ER) as an example, the CCIs are cells 308, 310, 312, 314, 316, and 318.

Note that cell 320 does not provide CCI because it has an odd color component and is not provided with spot beam energy at the same time as the cell 306 (color 1ER) (i.e., the hop locations are mutually exclusive). The laydown 300 also provides minimal interference when hop locations are non-mutually exclusive. In the non-mutually exclusive case, there exist only 6 CCIs, 2 ACIs, and 2 XPIs. The ACIs are cells 322 and 324, while the XPIs are cells 320 and 326. Note that not all colors (e.g., 2OL) need be used in a beam hopping beam laydown.

Figure 4:
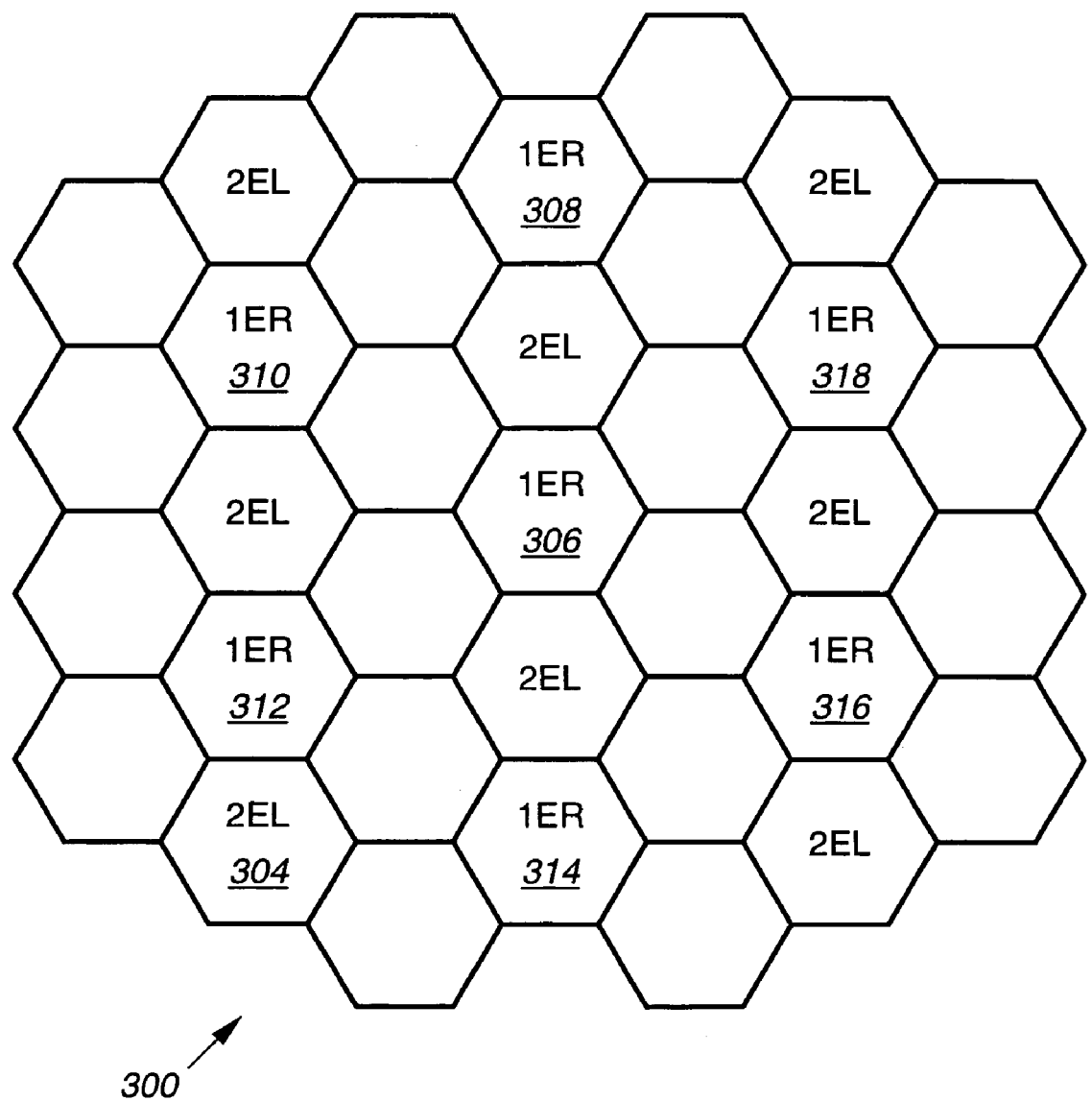
FIG. 4 shows the even hop downlink beams from the beam laydown of FIG. 3.
Figure 5:
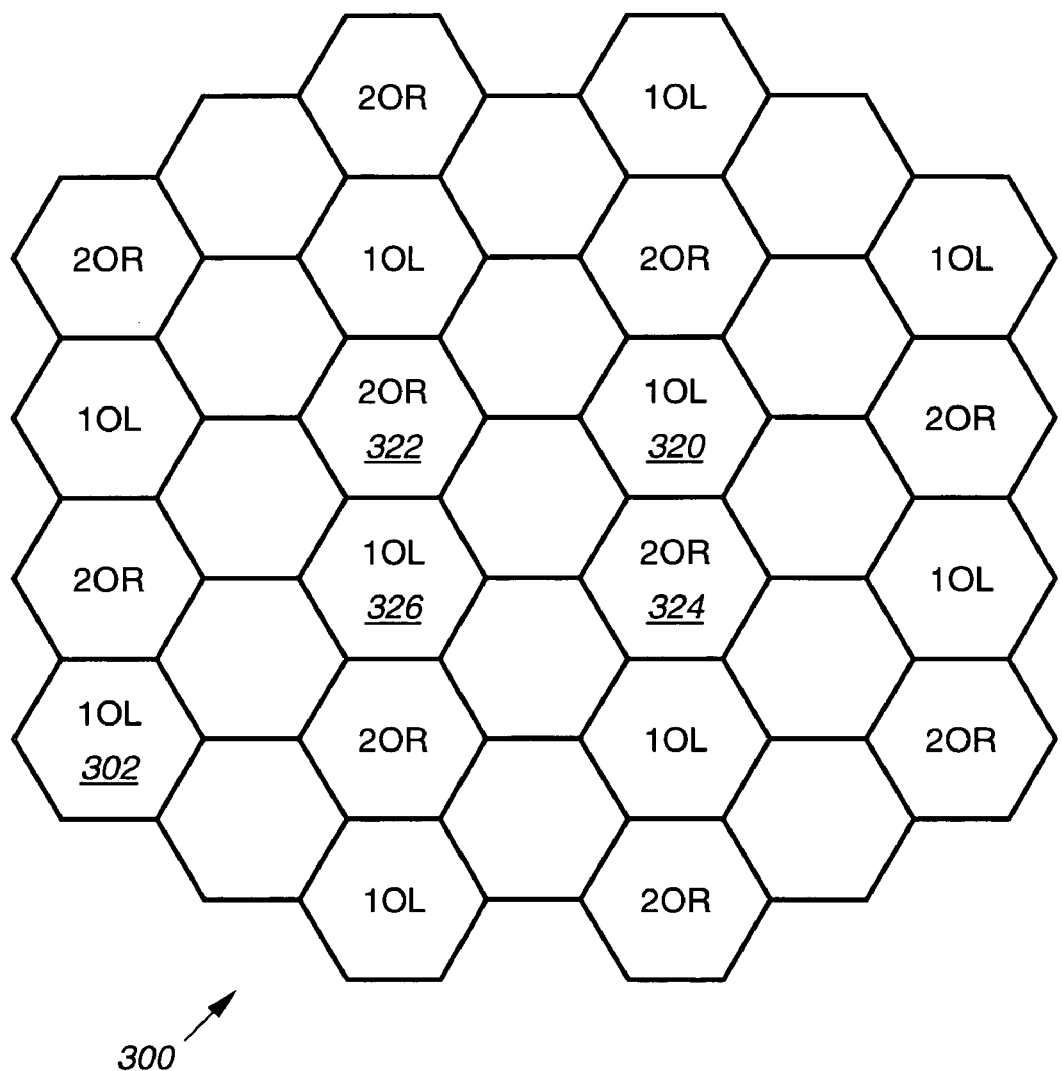
FIG. 5 depicts the odd hop downlink beams from the beam laydown of FIG. 3.

FIG. 4 shows the laydown 300 as well. In FIG. 4, however, only the even hop locations are marked. Similarly, FIG. 5 shows the beam laydown 300 with only the odd hop locations marked.

Figure 6:
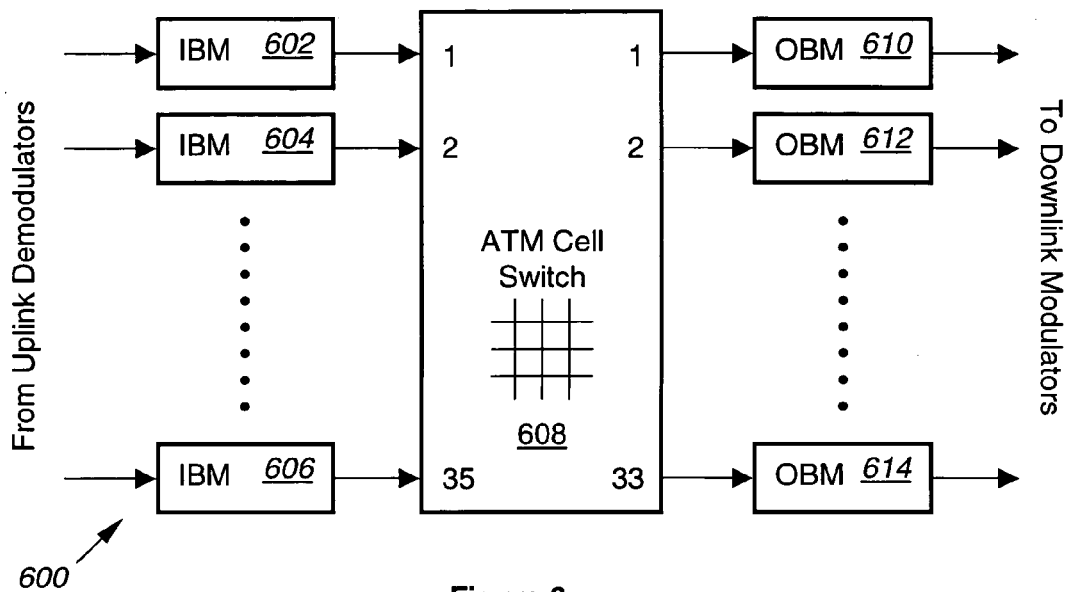
FIG. 6 shows an implementation of a router.

Turning next to FIG. 6, a preferred implementation of a router 600 is illustrated. The router 600 includes thirty-five inbound modules (IBMs), three of which are designated 602, 604, 606. The IBMs 602–606 are coupled to input ports of an ATM cell switch 608. The ATM cell switch 608 has thirty-three outputs coupled to individual outbound modules (OBMs), three of which are designated 610, 612, 614 pairs of uplink demodulators feed each IBM 602–606, while the OBMs 610–614 feed downlink modulators.

The router 600 provides a self addressed packet switching function. In other words, the router 600 uses addressing or destination information present in uplink data (e.g., ATM cells) to deliver the cells to a specific data queue that feeds a downlink beam appropriate for the destination or next hop of the cell. Thus, for example, the VPI/VCI fields in an ATM cell may be used to guide the cell into an appropriate downlink queue. Cells may first be discarded however, if they fail their header error check.

The output of the IBMs 602–606 includes a routing tag, a queue tag, and the (possibly modified) cell itself. The role of the IBMs 602–606, the routing tag and, the queue tag will be described in more detail below with respect to FIG. 7. In general, the ATM cell switch 608 uses the bits in the routing tag to connect a cell switch input port to a cell switch output port. The queue tag, a portion of the routing tag, and the cell itself then flow through the switch to the OBM connected to the selected output port. As will be described in more detail below, each OBM 610–614 includes a set of downlink queues that feed downlink beams directed to predetermined terrestrial cells. The queue tag determines in which downlink queue the cell will be inserted in the OBM (and may be indicative of cell priority and downlink coding rate). Thus, the IBMs 602–606, the ATM cell switch 608, and the OBMs 610–614 operate in concert to deliver cells to an appropriate downlink queue in a self addressed manner.

Figure 7:
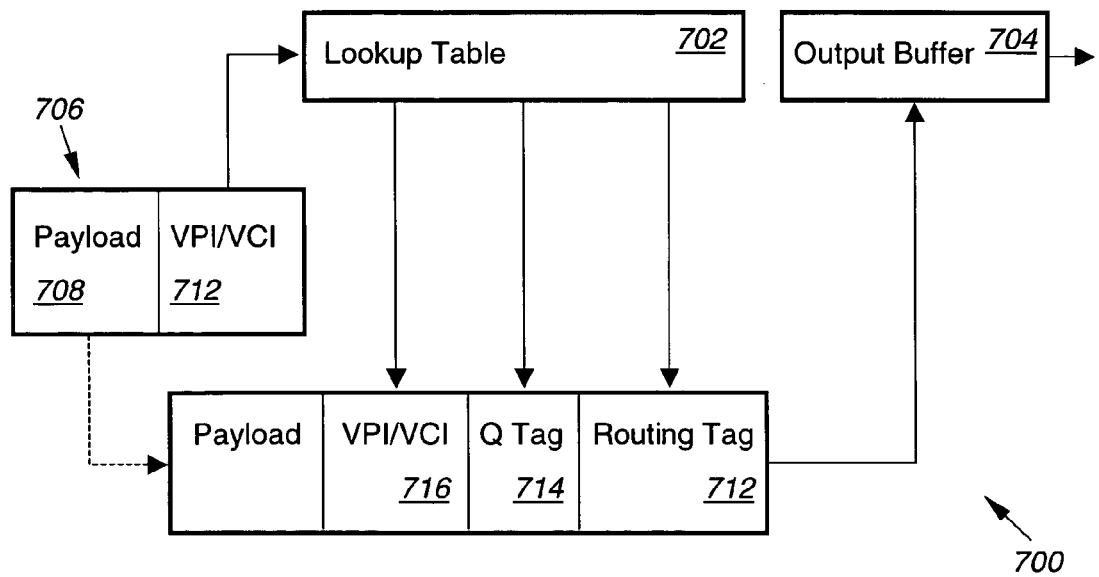
FIG. 7 shows an implementation of an inbound module.

FIG. 7 illustrates an implementation 700 of the IBMs 602–606. In particular, the implementation 700 includes a routing or lookup table 702 and an output buffer 704. An incoming ATM cell generally indicated at 706 is shown to include (among other fields) a payload 708 and a VPI/VCI address 710. FIG. 7 also illustrates a particular routing tag 712, queue tag 714, and optional replacement VPI/VCI 716 field for the cell from among those stored in the routing table 702. If the cell is modified (e.g., by changing its VPI/VCI), the IBM will also recompute the cell header error check. A ground based Network Control Center (NCC) may dynamically update the routing table 702 to ensure proper routing of cells from the current network node (e.g., the satellite) to the next network node (e.g., a ground terminal).

The VPI/VCI 710 of the cell 706 addresses the routing table 702. In response, the routing table 702 provides the routing tag 712, queue tag 714, and new VPI/VCI addresses 716 (e.g., for the next hop that the cell will make). A NULL entry in the routing table 702 may indicate that the cell is to be discarded. Any modifications to the uplink cell result in the IBM recomputing an error check for the uplink cell as well. This information enters the output buffer 704 (which may be, for example, 8191 cells in length). Once in the output buffer 704, the information awaits selection by an arbitration algorithm before it enters the cell switch 608. As examples, the arbitration algorithm may give preference to the oldest cells (e.g., using a two bit quantization of clock cycle cell age), the remaining capacity of the output buffer 704 (e.g., using a three bit quantization of total input queue size), and the like.

Once the cell is selected, its routing tag is used to send the cell to an associated output port of the cell switch 608. In particular, the routing tag 712 is preferably seven bits in length. The ATM cell switch 608 uses six of the seven bits internally to connect an input port to an output port determined by the six bits. For future expandability, the seventh bit may be used, for example, to support larger switches with additional output ports.

Figure 8:
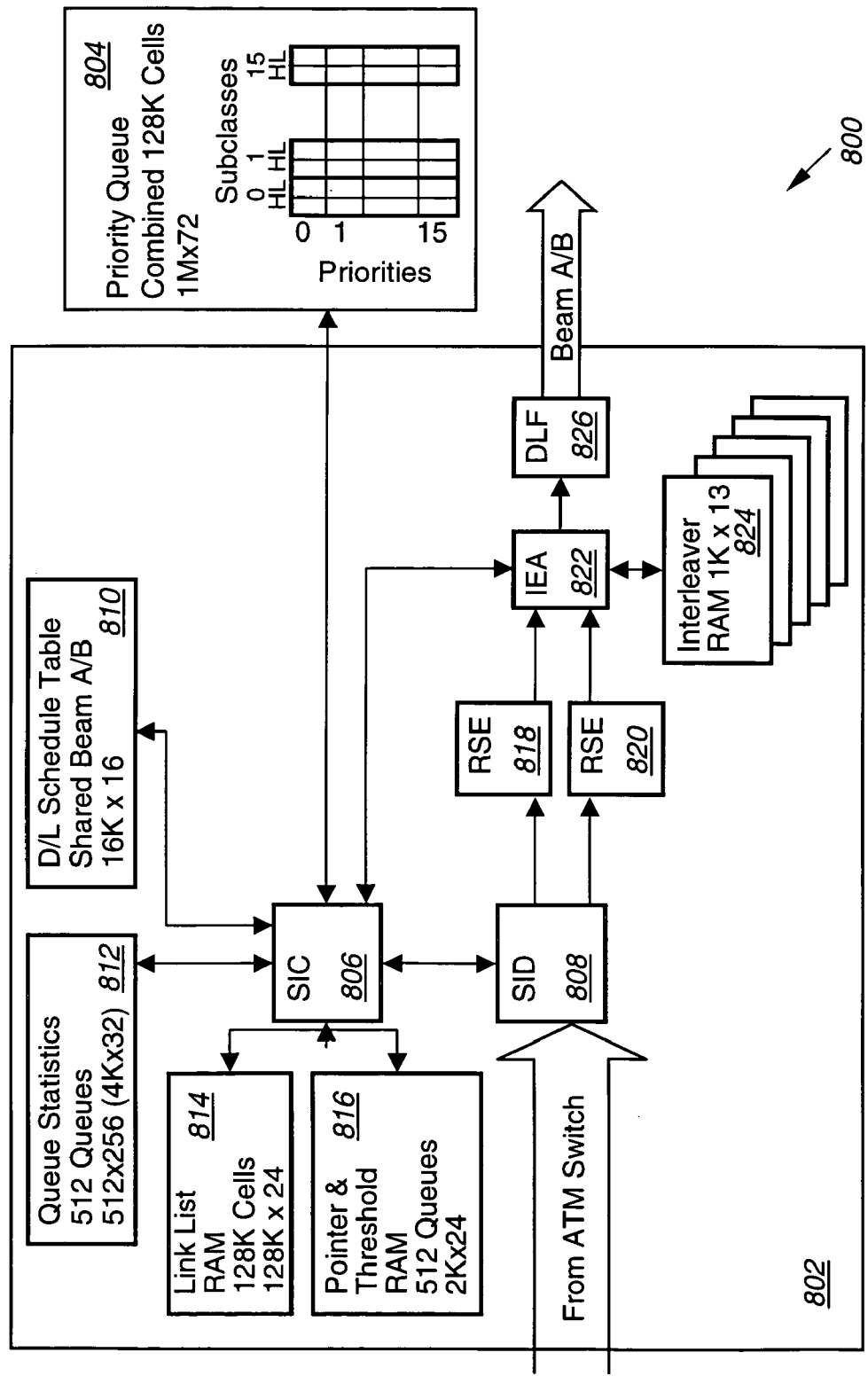
FIG. 8 illustrates an implementation of an outbound module.

Turning now to FIG. 8, that figure illustrates an implementation of an OBM 800. The OBM 800 includes an OBM controller 802 coupled to an external cell memory 804. The OHM controller 802 integrates, preferably, into a single ASIC a switch interface controller (SIC) 806 and a switch interface data handler (SID) 808. The SIC 806 couples to a downlink schedule table 810, a queue statistics memory 812, a linked list memory 814, and a pointer memory 816. In addition, the OHM 800 includes a first Reed-Solomon encoder (RSE) 818, a second RSE 820, interface electronics (IEA) 822 coupled to interleaving memory 824, and a downlink frame formatter (DLF) 826.

The external cell memory 804 is preferably organized into numerous queues. The queues may be distinguished by characteristics such as hop location, priority, and code rate, or other criteria. In general, for each hop location, there may be one or more code rates, each having one or more priority queues. In one embodiment, there are 16 downlink hop locations (referred to as a subclass) the external cell memory 804 includes 16 light coding queues and 16 heavy coding queues (i.e., 512 total queues). Each of the 16 light and 16 heavy coding queues represents a predetermined priority. One queue (e.g., priority 15, subclass 15, light coding) may be reserved for system controller traffic. The queue tag determines the subclass and the queue for which a cell is destined. The external cell memory 804 is preferably a multiport memory shared between output ports of the cell switch 608. The multiport nature of the external cell memory 804 resides in its role as shared storage for multiple hop locations (i.e., Beam A and Beam B that share a single physical cell switch 608 output port) served by the single OBM controller 802.

The memory provided by the external cell memory 804 may be allocated in a fixed or dynamic manner (e.g., from frame to frame) in several different ways. As one example, one or more queues may be allocated a fixed amount of memory to meet the expected long term needs of the subclass and priority associated with the queue. The remaining memory may then be shared by the remaining queues. To guarantee a minimum bandwidth for each queue, a minimum threshold amount of memory may be reserved for each queue. Thus, the external cell memory 804 permits pairing destination bandwidth needs for a particular destination at a particular time with allocations of queue memory. To that end, the NCC may dynamically uplink to the satellite changes to the manner in which memory is allocated. The thresholds, maximum queue size, minimum queue size, and the like are stored in the pointer memory 816.

The SIC 806 comprises logic that directs the activities of the OBM controller 802, including obtaining cells from the cell switch 608 through the SID 808. As will be described in more detail below, the SIC 806 makes a determination regarding whether the cell should be accepted or rejected using parameters for each queue stored in the pointer memory 816. If a cell is accepted, the SID 808 stores the cell in a queue in the external cell memory 804. The SIC 806 then updates the linked list memory 814 to record where the cell was stored in the external cell memory 804. The SIC 806 also updates the queue statistics memory 812 to reflect the number of cells in each queue in the external memory 804, the number of cells accepted or rejected for each queue, peak queue occupancies, the number of cells pulled from the each queue for transmission, and the number of threshold failure cells.

The SIC 806 and SID 808 handle retrieval of cells from the external cell memory 804 under in accordance with a schedule stored in the downlink schedule table 810. In particular, the downlink schedule table specifies for each frame parameters such as code selection, power gating, cell selection, and the like.

The structure of the downlink schedule table is described in detail in application Ser. No. 09/599,041, filed Jun. 21, 2000 and is incorporated herein by reference in its entirety.

The RSEs 818 and 820 apply a Reed-Solomon block code (e.g., a (236, 212) block code) to cells retrieved for transmission. The IEA 822 subsequently interleaves, scrambles, and convolutionally codes the block coded cells. To that end, for example, the convolutional code may be a ¾ rate constraint length 7 punctured convolutional code for light coded cells, and a ⅜ rate constraint length 7 punctured convolutional code for heavy coded cells. The DLF 826 then forms, preferably, a two payload downlink frame for the downlink, including overhead information (e.g., synchronization codes, code identifiers, guard time, and the like). Each payload may independently carry 12 heavy coded cells or 24 light coded cells.

Additional details of the frame format, coding, interleaving, and scrambling may be found in application Ser. No. 09/599,040, filed Jun. 21, 2000, titled "Downlink Beam Hopping Waveform.", and is incorporated herein by reference in its entirety.

Figure 9:
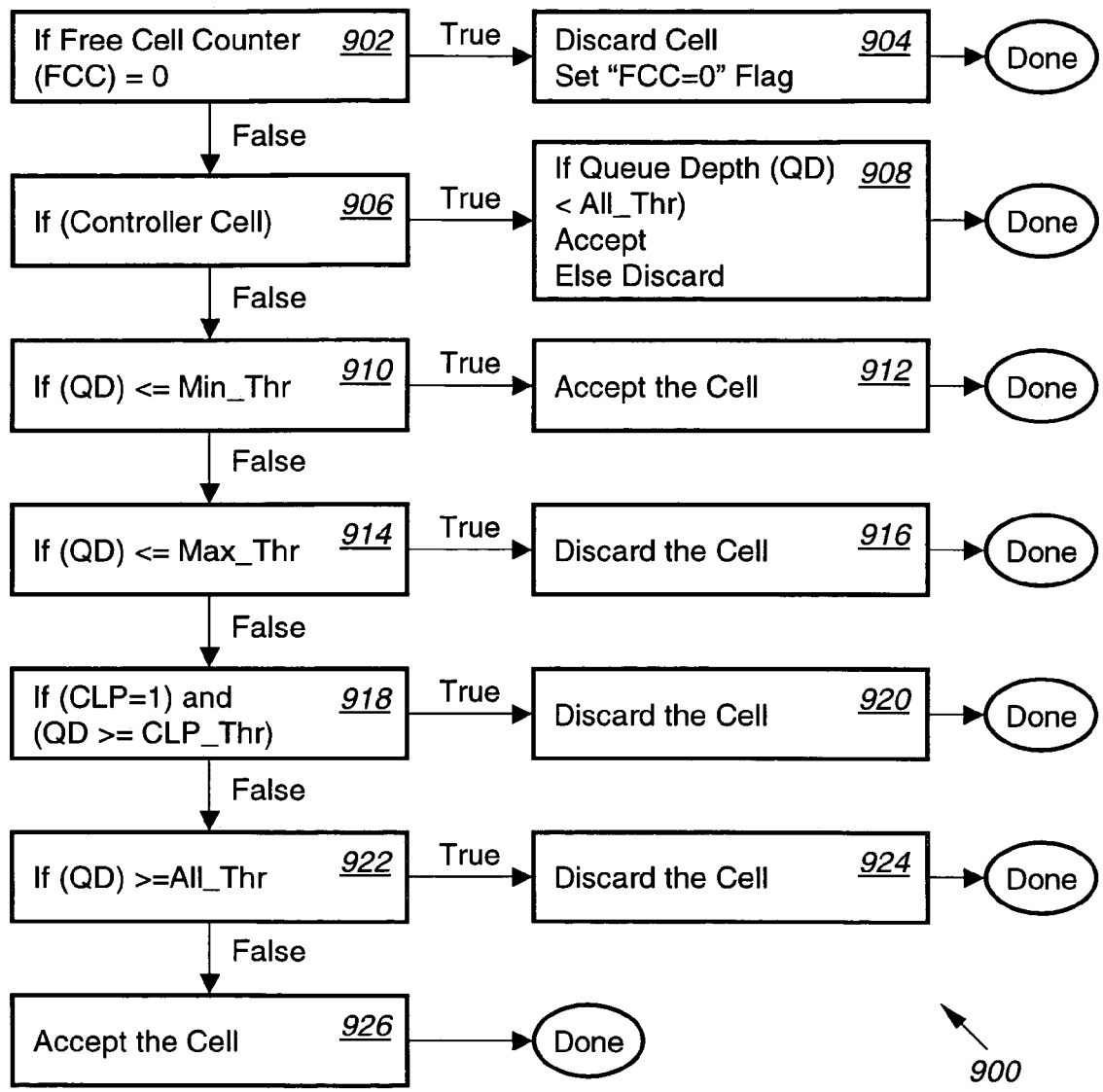
FIG. 9 shows a cell discard algorithm for fixed partition buffers.

As noted above, the SIC 806 makes a determination regarding whether a cell retrieved from the cell switch 608 should be accepted or rejected using parameters for each queue stored in the pointer memory 816. Turning now to FIG. 9, a flow diagram 900 presents a series of determinations made by the SIC 806 when queue are fixed in size. At step 902, the SIC 806 determines whether there is any free memory in which to store the cell. If the free cell counter (FCC) is zero, the cell is discarded (step 904). Otherwise the SIC 806 determines if the cell is a controller cell (step 906). A controller cell, for example, may be a cell that carries command, configuration, or status information from the NCC to the satellite (e.g., to update the routing table 702 or downlink scheduling table). If the cell is a controller cell, and if the associated queue depth (QD) is less than its maximum size (i.e., the All_Thr), then the cell is accepted, otherwise it is discarded (step 908).

Continuing at step 910, if the queue depth is less than or equal to the minimum threshold queue size (Min_Thr) then the cell is accepted (step 912). Step 914 checks to see if the queue depth is greater than the maximum allowed queue size (Max_Thr), and if so the cell is discarded (step 916). Beginning at step 918 the SIC 806 may accept or discard the cell based on the Cell Loss Priority (CLP) field found, for example, in an ATM Cell.

A CLP of zero indicates that the cell is of high priority and should not be dropped during periods of high congestion. A CLP of one indicates that the cell is of low priority and should be dropped, if needed, during periods of high congestion. At step 918, if the cell is low priority, and the queue depth is greater than the cell loss priority threshold (CLP Thr), then the cell is discarded (step 920). If (step 922) the queue depth is greater than All Thr, then the cell is discarded (step 924). Otherwise, the cell is accepted (step 926).

Figure 10:
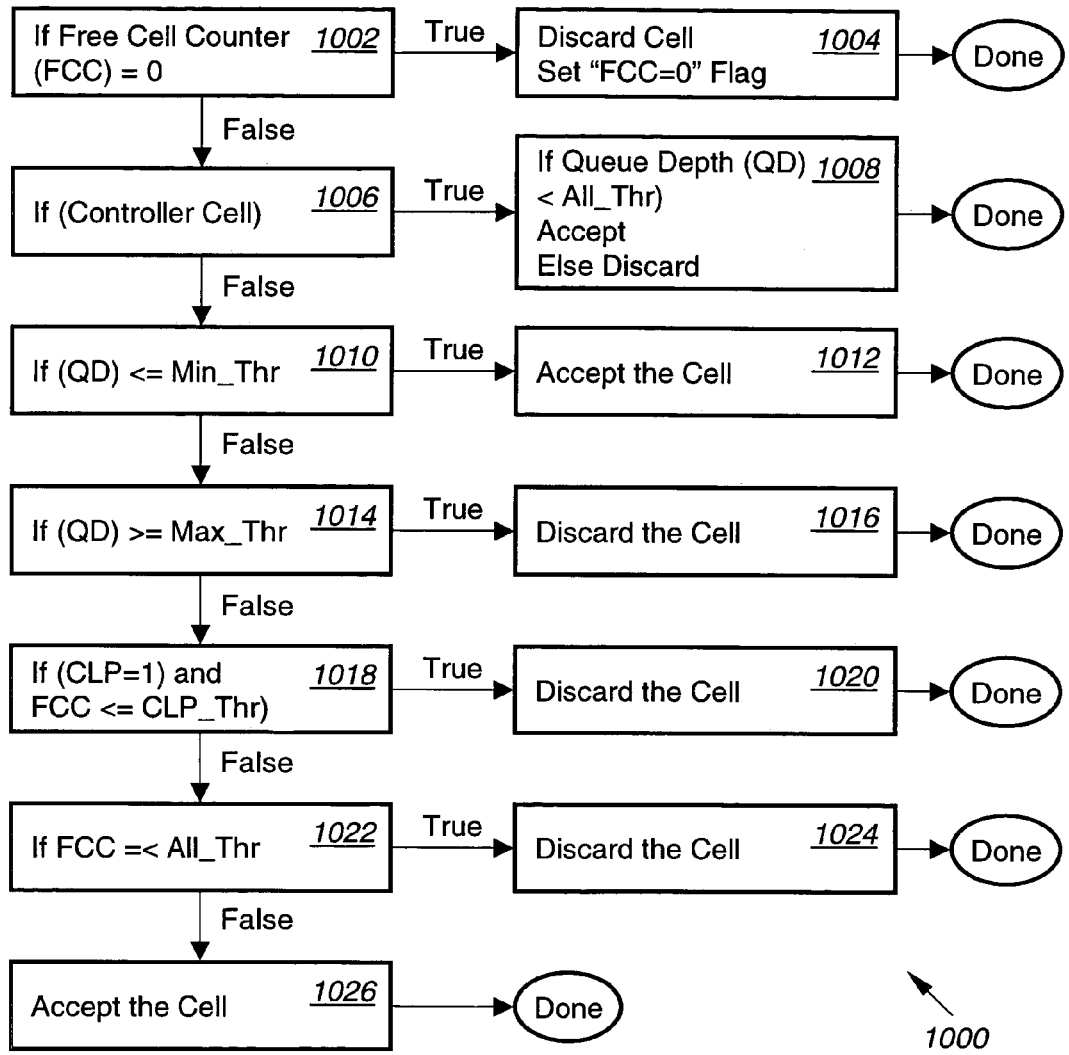
FIG. 10 shows a cell discard algorithm for dynamically buffered queues.

When queues are allocated memory in a dynamic fashion, the SIC 806 follows the steps indicated in FIG. 10 to determine whether a cell is to be accepted. In particular, at step 1002, the SIC 806 determines whether there is any free memory available to store the cell. If the free cell counter (FCC) is zero, the cell is discarded (step 1004). Otherwise the SIC 806 determines if the cell is a controller cell (step 1006). If so, if the queue depth (QD) is less than All_Thr, then the cell is accepted, otherwise discarded (step 1008).

Continuing at step 1010, if the queue depth is less than or equal to the minimum threshold queue size (Min_Thr) then the cell is accepted (step 1012). Step 1014 checks to see if the queue depth is greater than the maximum allowed queue size (Max_Thr), and if so the cell is discarded (step 1016). At step 1018 the SIC 806 may accept or discard the cell based on the CLP. If the cell is low priority, and the amount of free memory is less than or equal to the cell loss priority threshold (CLP_Thr), then the cell is discarded (step 1020). If (step 1022) the amount of free memory is less than All_Thr, then the cell is discarded (step 1024). Otherwise, the cell is accepted (step 1026).

The pointer memory 816 stores the thresholds referred to above, including the All_Thr, Min_Thr, Max Thr, CLP Thr, and FCC for each queue.

Figure 11:
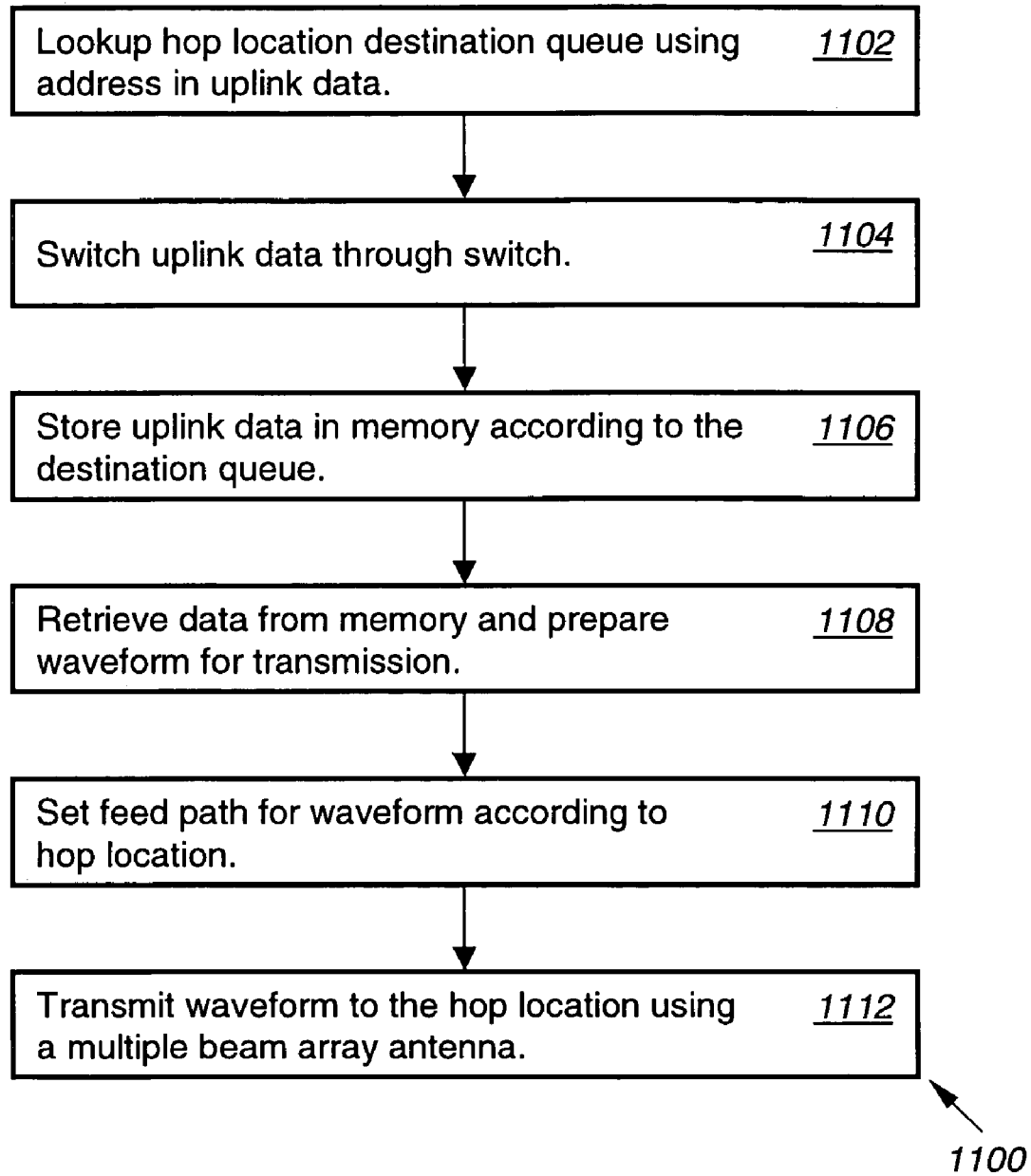
FIG. 11 illustrates a method for routing data through a satellite to a selected downlink hop location.

FIG. 11 summarizes a method 1100 for routing data through a satellite to a selected downlink hop location. At step 1102, the satellite looks up a hop location destination queue using an address carried in the uplink data. Next, at step 1104, the satellite switches the uplink data through a switch, and stores (step 1106) the data in the appropriate queue.

In building frames for transmission, the satellite, at step 1108, first retrieves data from the queue in order to build the downlink waveform. The satellite then selects a feed path for the waveform according to its destination hop location (step 1110). The waveform is transmitted (step 1112), preferably using a multiple beam array antenna with feed elements assigned to the hop locations.

Thus, the present invention provides a beam hopping self addressed packet switched communication system. In particular, the communication system uses a multiple beam array antenna to generate spot beams covering different terrestrial cells in response to a predetermined hop pattern. The extensive set of queues provided storage for cells of many different priorities, hop locations, and coding rates.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A communication satellite using beam hopping to reach multiple terrestrial cells in a beam laydown pattern, the satellite comprising:
   means for receiving packets of uplink data for transmission through multiple downlink beams to multiple hop locations corresponding to multiple terrestrial cells;
   a multiple beam downlink antenna comprising a plurality of radiating elements, each of which is responsible for generating an independently controllable downlink beam to one of an equal plurality of terrestrial cells that are contiguously arrayed in a beam laydown pattern covering a terrestrial region;
   a self addressed packet switch for routine unlink data packets to a memory, wherein each unlink data packet contains destination information; and
   means for controlling selection of downlink beams in a beam hopping manner, including a switch that directs a waveform derived in part from each uplink data packet to a selected radiating element of the multiple beam downlink antenna in response to a hop selection signal derived from the destination information in the packet;
   wherein the multiple beam downlink antenna directs the waveforms derived from the uplink data packets, by beam hopping to the appropriate destination terrestrial cells;
   wherein the switch also provides a color control signal to each downlink beam, to minimize interference between downlink channels;
   and wherein the memory comprises queues assigned to respective hop locations.

2. A communication satellite using beam hopping to reach multiple terrestrial cells in a beam laydown pattern, the satellite comprising:
   means for receiving rackets of uplink data for transmission through multiple downlink beams to multiple hop locations corresponding to multiple terrestrial cells;
   a multiple beam downlink antenna comprising a plurality of radiating elements, each of which is responsible for generating an independently controllable downlink beam to one of an equal plurality of terrestrial cells that are contiguously arrayed in a beam laydown pattern covering a terrestrial region;
   a self addressed packet switch for routing uplink data packets to a memory, wherein each unlink data packet contains destination information; and
   means for controlling selection of downlink beams in a beam hopping manner, including a switch that directs a waveform derived in part from each uplink data packet to a selected radiation element of the multiple beam downlink antenna in response to a hop selection signal derived from the destination information in the packet;
   wherein the multiple beam downlink antenna directs the waveforms derived from the unlink data packets, by beam hopping to the appropriate destination terrestrial cells;
   wherein the switch also provides a color control signal to each downlink beam, to minimize interference between downlink channels;
   and wherein the memory comprises queues distinguished by beam hop location and priority.

3. The communication satellite of claim 2, wherein the memory comprises queues further distinguished by a code rate.

4. The communication satellite of claim 3, wherein the queues are distinguished by a plurality priorities, a plurality code rates, and a plurality hop locations.

5. A beam hopping data routing subsystem for a communication satellite, the subsystem comprising:
   means for receiving packets of uplink data for transmission through multiple downlink beams to multiple hop locations corresponding to multiple terrestrial cells;
   an inbound module accepting demodulated uplink data, the inbound module including a routing table that stores queue tags specifying downlink beam hop locations for the uplink data;
   a switch having an input port coupled to the inbound module;
   an outbound module coupled to an output port of the switch, the outbound module including a memory for storing the uplink data according to the downlink beam hop locations; and
   a multiple beam array antenna coupled to the outbound module, the multiple beam array antenna comprising a plurality of feed elements assigned to respective downlink beam hop locations, wherein the downlink beam lop locations correspond to an equal plurality of terrestrial cells that are contiguously arrayed in a beam laydown pattern covering a terrestrial region;
   and wherein the data routing subsystem further comprises means for routing downlink data retrieved from the memory of the outbound module to appropriate feed elements of the multiple beam array antenna to direct the downlink data to required downlink hop locations.

6. The data routing subsystem of claim 5, wherein the feed elements are feed horns.

7. The data routing subsystem of claim 5, wherein the queue tag further specifies code rate for the uplink data.

8. The data routing subsystem of claim 7, wherein the queue tag further specifies priority for the uplink data.

9. The data routing subsystem of claim 5, wherein the routing table additionally stores routing tags indicative of at least one switch output port.

10. The data routing subsystem of claim 5, wherein the routing table is addressed with an address included In the uplink data.

11. The data routing subsystem of claim 10, wherein the address is at least one of a VPI and VCI field in an ATM cell.

12. The data routing subsystem of claim 11, wherein the routing additionally stores a replacement address for the uplink data.

13. A method for communicating data through a communication satellite that uses beam hopping to reach multiple terrestrial cells in a beam laydown pattern, the method comprising:
   receiving packets of uplink data for transmission through multiple downlink beams to multiple hop locations corresponding to multiple terrestrial cells;
   looking up a memory queue indicative of hop location using an address included in each uplink data packet,
   storing the uplink data packets in the memory queue;
   retrieving the uplink data packets and preparing for each a waveform to be transmitted;
   selecting a feed path for each waveform according to the hop location;
   selecting a color control signal for each downlink beam, to minimize interference between downlink channels and
   transmitting the waveforms using beam hopping in a multiple beam downlink antenna; wherein the step of selecting a feed path for each waveform effectively hops transmission from one downlink beam to another.

14. The method of claim 13, wherein looking up comprises looking up a queue tag for each uplink data packet.

15. The method of claim 14, wherein the step of looking up further comprises looking up a queue tag specifying the priority for each uplink data packet.

16. The method of claim 15, wherein the step of looking up further comprises looking up a queue tag specifying a code rate for each uplink data packet.

17. The method of claim 13, further comprising the steps of looking up a routing tag for each uplink data packet and switching the uplink data packet to the memory using the routing tag.

18. The method of claim 13, wherein selecting a feed path comprises switching a ferrite switch.

* * * * *